United States Patent Office 3,471,527
Patented Oct. 7, 1969

3,471,527
PROCESS FOR THE PREPARATION OF 3-ACYLOXY-17-KETOSTEROID-3,5,7-TRIENES
Gunther Kruger, St. Laurent, Montreal, Quebec, Surendra N. Sehgal, Dollard des Ormeaux, Montreal, Quebec, and Claude Vezina, Oka, Montreal, Quebec, Canada, assignors to American Home Products Corporation, New York, N.Y., a corporation of Delaware
No Drawing. Filed Mar. 20, 1967, Ser. No. 624,205
Int. Cl. C07c 167/32, 169/10, 167/00
U.S. Cl. 260—397.4   11 Claims

ABSTRACT OF THE DISCLOSURE

There is disclosed herein a process for preparing 3-(lower acyloxy)-estra-3,5,7-trien - 17 - ones and 3-(lower acyloxy) - 19 - hydroxyandrosta-3,5,7 - trien-17-ones, and for converting those compounds to equilin by microbiological means.

---

The present invention relates to a process for preparing 3-acyloxy-17-ketosteroid - 3,5,7-trienes which may be converted to equilin, a potent naturally occurring estrogen, by microbiological means.

More particularly, the present invention relates to a process of steroidal enol acylates represented by Formula I, in which R represents

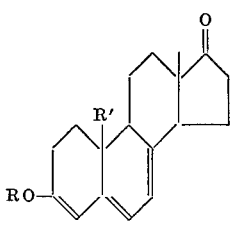

I a lower aliphatic acyl group, such as, for example, acetate, propionate or butyrate, and R' represents hydrogen or a hydroxy-methyl group. These enol acylates are useful intermediates for the synthesis of equilin, an important estrogenic hormone; for example, D. S. Irvine, J. F. Bagli, C. Vezina, and K. Wiesner describe in U.S. Patent No. 3,272,848 the direct conversion of the enol acetate, 3-acetoxyestra - 3,5,7 - trien - 17 - one (I, R=COCH₃ and R'=H) to equilin by the microorganism Nocardia restrictus.

There is, for example, a proces for the preparation of the steroidal enol acetate, 3-acetoxyestra - 3,5,7 - trien-17-one, described by D. A. Irvine et al., U.S. Patent No. 3,272,848 and by J. F. Bagli, P. F. Morand, K. Wiesner, and R. Gaudry in Tetrahedron Letters 387 (1964), whereby a solution of estra-4,6-diene-3,17-dione in acetic anhydride, acetyl chloride and pyridine is boiled for a period of 2¼ hours. It is a particular advantage of the process of this invention that the preparation of the enol acylates, for example, 3-acetoxyestra-3,5,7-trien-17-one, is achieved by much milder conditions and in a much shorter reaction time.

It is another advantage of the process of this invention that it permits obtention of Δ⁷-19-norsteroids from the easily available Δ⁴,⁶-3-ketosteroid-19-aldehydes and 19-carboxylic acids in a more efficient manner than known herebefore.

The preferred starting materials for the process of this invention are represented by Formula II,

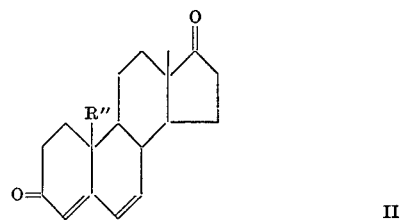

II in which R" represents hydrogen, formyl, carboxyl or hydroxymethyl.

In a preferred embodiment of this invention estra-4,6-diene-3,17-dione (II, R'=H), prepared as described by K. Heusler, J. Kalvoda, Ch. Meystre, H. Ueberwasser, P. Wieland, G. Anner, and A. Wettstein, Experientia 18, 464 (1962), or in U.S. Patent No. 3,272,847, is treated with 0.1 to 80 parts, preferably 7.5 parts, of an alkali metal alkoxide of lower alkanols, such as, for example, potassium t-butoxide or preferably sodium methoxide, or an alkali metal hydroxide, such as, for example, potassium hydroxide, or sodium hydroxide, or an alkali metal hydride such as, for example, sodium hydride, in dimethylsulfoxide solution, or by using a previously prepared solution of methylsulfinyl anion in dimethylsulfoxide prepared according to Corey and Chaykovsky, J. Am. Chem. Soc., 84, 866 (1962), with or without an inert cosolvent such as ether, benzene, or tetrahydrofuran, preferably in a nitrogen atmosphere for a period of 10 seconds to one hour, preferably 3 minutes, at temperatures ranging from —20° to +60° C., with preference to the 0°–20° C. range. Subsequent treatment of the reaction mixture with an excess of an acyl anhydride such as, for example, acetic anhydride, propionic anhydride, and butyric anhydride, preferably diluted with an inert solvent such as, for example, ether, benzene, or hexane, at temperatures from —30° to 40° C., preferably —15° C., for a minimum period of one minute, preferably 3 minutes followed by neutralization of the mixture by the addition of a dilute acid such as, for example, 2 N aqueous hydrochloric acid yields the desired enol acylate such as, for example, 3-acetoxyestra-3, 5,7-trien-17-one (I, R=CH₃CO), 3-propionoxyestra-3,5,7-trien-17-one, (I, R=CH₃CH₂CO) and 3-butyryloxyestra-3,5,7-trien-17-one (I, R=CH₃CH₂CH₂CO), respectively, which may be isolated by extraction and purified by recrystallization.

In the same manner, but by replacing estra-4,6-dien-3, 17-dione with either 3,17-dioxoandrosta-4,6-dien-19-al (II, R'=CHO), described by K. Heusler et al. Experientia, 18 464 (1962), or with 3,17-dioxoandrosta-4,6-dien-19-oic acid (II, R"=COOH), described in U.S. Patent No. 3,250,792, and by using again the appropriate anhydride, such as, for example, acetic anhydride, propionic anhydride and butyric anhydride, the same respective enol acylates such as, for example, 3-acetoxyestra-3,5,7-trien-17-one, 3-propioxyestra-3,5,7-trien-17-one, and 3-butyryloxyestra-3,5,7-triene-17-one, are obtained.

Again in the same manner, but by replacing estra-4,6-dien-3,17-dione with 19-hydroxyandrosta-4,6-dien-3,17-dione (II, R=CH₂OH), described by Heusler et al. Experientia, 18, 464 (1962), and by using again the appropriate anhydride such as, for example, acetic anhydride, propionic anhydride and butyric anhydride, the corresponding enol acylates such as, for example, 3-acetoxy- 19-hydroxyandrosta-3,5,7-trien-17-one (I, R=CH$_3$CO and R'=CH$_2$OH), 18-hydroxy-3-propionoxyandrosta-3,5,7-trien-17-one (I, R=CH$_3$CH$_2$CO and R'=CH$_2$OH), and 3-butyryloxy-19-hydroxyandrosa-3,5,7-trien-17-one, (I, R=CH$_3$CH$_2$CH$_2$CO and R'=CH$_2$OH), respectively are obtained. Those may be converted directly to equilin by a microbiological transformation described below.

It is a novel feature of the process of this invention that 19-hydroxyandrosta-4,6-dien-3,17-dione is converted to 3-acyloxy-19-hydroxyandrosta-3,5,7-trien-17-ones, while the C$_{19}$ hydroxy group remains unaffected. It is well known that under the usual conditions of enol acylate formation that primary alcohols such as the C$_{19}$ hydroxy group are readily acylated, for example see J. F. Bagli et al., Tetrahedron Letters, 387 (1964).

By exposing the novel enol acylates of this invention such as, for example, 3-acetoxy-19-hydroxy-3-propionoxyandrosta-3,5,7-trien-17-one, 19-hydroxy-3-propionoxyandrosta-3,5,7-trien-17-one, and 3-butyryloxy-19-hydroxyandrosta-3,5,7-trien-17-one to the activity obtainable in a suitable medium inoculated with microorganisms from the species Nocardia, such as, for example, *N. rubra* NRRL B-685, *N. corallina* ATCC 999, ATCC 13, 258 and ATCC 13,259, *N. restrictus* ATCC 14887, *N. asteroides* ATCC 6846, ATCC 9970 and 10,904, *N. canicruria* ATCC 17,896, *N. erythropolis* ATCC 17,895, *N. opaca* ATCC 4276, and *N. convoluta* ATCC 4275; *Arthrobacter simplex* ATCC 13,260, Arthrobacter species ATCC 19,140; *Corynebacterium simplex* ATCC 6946; Mycobacterium, such as, for example, *M. rhodochrous* ATCC 4273, and ATCC 9356, or *M. fortuitum* ATCC 6841; equilin is obtained. This may be accomplished by exposing the novel enol acylates to the enzymatic activity obtainable from a growing culture or from the resting cells of the microorganism.

The following examples will illustrate this invention.

Example 1.—3-acetoxyestra-3,5,7,-trien-17-one

Sodium methoxide (1.5 g.) is added in one portion to a suspension of finely divided estra-4,6-diene-3,17-dione (II, R'=H; 1.0 g.) in dimethylsulfoxide (10 ml.) cooled to 18° C. The mixture is agitated under nitrogen for 3 minutes and then poured into a rapidly stirred mixture of ether (5 ml.) and acetic anhydride (5 ml.) which has been cooled to −15°. The mixture is stirred for 3 minutes and then 2 N aqueous hydrochloric acid (50 ml.) is added in one lot. After stirring for an additional 3 minutes the organic phase is separated, washed with five 20 ml. portions of water, dried over sodium sulfate, filtered, and evaporated. The crystalline residue is recrystallized from methanol yielding the title compound as pale yellow needles, M.P. 175–178° C., which is not depressed on admixture with an authentic sample.

In the same manner but by substituting an equivalent amount of either 3,17-dioxoandrosta-4,6-dien-19-al, or 3,17-dioxoandrosta-4,6-dien-19-oic acid for estra-4,6-diene-3,17-dione, the title compound is obtained.

Example 2.—3-propionoxyestra-3,5,7-trien-17-one

Following the procedure of Example 1 but substituting an equivalent amount of propionic anhydride for acetic anhydride, the title compound is obtained.

In the same manner but substituting an equivalent amount of either 3,17-dioxoandrosta-4,6-dien-19-al or 3,17-dioxoandrosta-4,6-dien-19-oic acid, the title compound is obtained.

Example 4.—3-acetoxy-19-hydroxyandrosta-3,5,7-trien-

Following the procedure of Example 1, but substituting an equivalent amount of butyric anhydride for acetic anhydride, the title compound is obtained.

In the same manner but substituting an equivalent amount of either 3,17-dioxoandrosta-4,6-dien-19-al or 3,17-dioxoandrosta-4,6-dien-19-oic acid, the title compound is obtained.

Example 4.—3-acetoxy-19-hydroxyandrosta-3,5,7-trien-17-one

Sodium methoxide (7.5 g.) is added in one portion to a suspension of finely divided 19-hydroxyandrosta-4,6-dien-3,17-dione (5.0 g.) in dimethylsulfoxide (50 ml.) at 20° C. The mixture is agitated under nitrogen for 20 seconds and then diluted with ether-acetic anhydride (25:2, 270 ml.) which has been precooled to −15° C. After an additional 3 minutes of stirring 2 N aqueous hydrochloric acid (250 ml.) is added and stirring is continued for 3 more minutes. The organic phase is separated, washed five times with 100 ml. portions of water, dried over sodium sulfate, filtered, and evaporated. The crystalline residue is recrystallized from methanol yielding the title compound, M.P. 153–156° C. λmax. 315 m$\mu$ ($\epsilon$=20,000).

Example 5.—19-hydroxy-3-propionoxyandrosta-3,5,7-trien-17-one

Following the procedure of Example 4 but substituting an equivalent amount of propionic anhydride for acetic anhydride, the title compound is obtained.

Example 6.—3-butyryloxy-19-hydroxyandrosta-3,5,7-trien-17-one

Following the procedure of Example 4 but substituting an equivalent amount of butyric anhydride for acetic anhydride, the title compound is obtained.

Example 7.—Equilin

A culture of *Nocardia rubra* NRRLB-685 from an agar slant is used to inoculate a sterile nutrient broth (50 ml.), beef extract: peptone (3:5) in a 250 ml. Erlenmeyer flask. After a 24 hour incubation period a solution of progesterone (0.5 ml. concentration=10 mg./ml. of acetone) is added and the incubation is continued for another 24 hours. At that time 3-acetoxy-19-hydroxyandrosta-3,5,7-trien-17-one (5 mg.) in acetone (0.5 ml.) is added to the growing culture. After another 24 hour incubation period the contents of the fermentation flask are extracted twice with ethyl acetate: benzene (1:4). The organic extract is dried over sodium sulfate, filtered, and evaporated to dryness under reduced pressure. Equilin (III) is isolated and identified by gas liquid chromatography as the main product of the reaction.

In the same manner but replacing *Nocardia rubra* NRRL B-685 with microorganisms from other species of Nocardia, such as, for example, *N. corallina* ATCC 999, ATCC 13,258, and ATCC 13,259, *N. restrictus* ATCC 14,887, *N. asteroides* ATCC 6846, ATCC 9970 and 10,904, *N. canicruria* ATCC 17,896, *N. erythropolis* ATCC 17,895, *N. opaca* ATCC 4276, and *N. convoluta* ATCC 4275; or with microorganisms from such species as *Arthrobacter simplex* ATCC 13,260, Arthrobacter species ATCC 19,140, *Corynebacterium simplex* ATCC 6946; Mycobacterium, such as, for example, *M. rhodochrous* ATCC 4273; and ATCC 9356, or *M. fortuitum* ATCC 6841; equilin is also obtained.

Again in the same manner but by substituting an equivalent amount of 19-hydroxy-3-propionoxyandrosta-3,5,7-trien-17-one or 3-butyryloxy-19-hydroxyandrosta-3,5,7-trien-17-one for 3-acetoxy-19-hydroxyandrosta-3,5,7-trien-17-one, and using any of the microorganisms mentioned above, equilin is obtained.

We claim:

1. The process of preparing an enol acylate which comprises treating a compound of the formulas

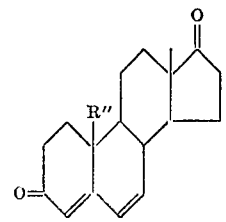

wherein R″ is selected from the group which consists of hydrogen, formyl, carboxyl and hydroxymethyl with a base selected from the group which consists of alkali metal alkoxides of lower alkanols, alkali metal hydroxides, alkali metal hydrides and a solution containing methy sulfinyl anion, said treatment being carried out at a temperature within the range −20° to 60° C.; treating the reaction mixture with an excess of an acyl anhydride selected from the group consisting of acetic, propionic and butyric anhydrides in an inert solvent at a temperature within the range −30° C. to 40° C.; and then neutralizing the reaction mixture by adding thereto a dilute acid.

2. The process as claimed in claim 1 wherein the starting material is estra-4,6-diene-3,17-dione, the acylating agent is acetic anhydride, and the enol acylate prepared is 3-acetoxyestra-3,5,7-trien-17-one.

3. The process as claimed in claim 1 wherein the starting material is 3,17-dioxoandrosta-4,6-dien-19-al, the acylating agent is acetic anhydride, and the enol acetate prepared is 3-acetoxyestra-3,5,7-trien-17-one.

4. The process as claimed in claim 1 wherein the starting material is 3,17-dioxoandrosta-4,6-dien-19-oic acid, the acylating agent is acetic anhydride, and the enol acylate prepared is 3-acetoxyestra-3,5,7-trien-17-one.

5. The process as claimed in claim 1 wherein the starting material is estra-4,6-diene-3,17-dione, the acylating agent is propionic anhydride, and the enol acylate prepared is 3-propionoxyestra-3,5,7-trien-17-one.

6. The process as claimed in claim 1 wherein the starting material is estra-4,6-diene-3,17-dione, the acylating agent is butyric anhydride, and the enol acylate prepared is 3-butyryloxyestra-3,5,7-trien-17-one.

7. The process as claimed in claim 1 wherein the starting material is 3,17-dioxoandrosta-4,6-dien-19-al, the acylating agent is propionic anhydride, and the enol acylate prepared is 3-propionoxyestra-3,5,7-trien-17-one.

8. The process as claimed in claim 1 wherein the starting material is 3,17-dioxoandrosta-4,6-dien-19-oic acid, the acylating agent is propionic anhydride, and the enol acylate prepared is 3-propionoxyestra-3,5,7-trien-17-one.

9. The process as claimed in claim 1 wherein the starting material is 19-hydroxyandrosta-4,6-diene-3,17-dione, the acylating agent is acetic anhydride, and the enol acylate prepared is 3-acetoxy-19-hydroxyandrosta-3,5,7-trien-17-one.

10. The process as claimed in claim 1 wherein the starting material is 19-hydroxyandrosta-4,6-diene 3,17-dione, the acylating agent is propionic anhydride, and the enol acylate prepared is 19-hydroxy-3-propionoxyandrosta-3,5,7-trien-17-one.

11. The process as claimed in claim 1 wherein the starting material is 19-hydroxyandrosta-4,6-diene-3,17-dione, the acylating agent is butyric anhydride, and the enol acylate prepared is 3-butyryloxy-19-hydroxyandrosta-3,5,7-trien-17-one.

References Cited

UNITED STATES PATENTS 3,344,156   9/1967   Bagli et al. _____ 260—397.4

ELBERT L. ROBERTS, Primary Examiner

U.S. Cl. X.R.

195—51; 260—397.1, 397.3

UNITED STATES PATENT OFFICE
CERTIFICATE OF CORRECTION

Patent No. 3,471,527      October 7, 1969

Gunther Kruger et al.

It is certified that error appears in the above identified patent and that said Letters Patent are hereby corrected as shown below:

Column 3, line 2, "18-hydroxy" should read -- 19-hydroxy --; line 4, "hydroxyandrosa" should read -- hydroxyandrosta --; line 66, the entire line should read -- Example 3.  3-Butyryl-oxyestra-3,5,7-trien-17-one --.

Signed and sealed this 26th day of May 1970.

(SEAL)
Attest:

Edward M. Fletcher, Jr.
Attesting Officer

WILLIAM E. SCHUYLER, JR.
Commissioner of Patents